United States Patent
Hsu et al.

(10) Patent No.: US 8,813,105 B1
(45) Date of Patent: Aug. 19, 2014

(54) CLAMPING APPARATUS FOR CARRYING A DISK IN AN OPTICAL DISK DRIVE

(71) Applicant: Lite-On IT Corporation, Taipei (TW)

(72) Inventors: Shih-Ming Hsu, Hsinchu (TW); Hai-Sheng Hu, Hsinchu (TW); Zan-Xun Cen, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/913,529

(22) Filed: Jun. 10, 2013

(30) Foreign Application Priority Data

Mar. 8, 2013 (CN) .......................... 2013 1 0073216

(51) Int. Cl.
*G11B 17/028* (2006.01)
(52) U.S. Cl.
CPC .................................. *G11B 17/0284* (2013.01)
USPC ....................................................... 720/707
(58) Field of Classification Search
CPC ........... G11B 17/0282; G11B 17/0284; G11B 17/0286; G11B 17/05; G11B 19/2009; G11B 33/08; G11B 17/021; G11B 17/022
USPC ................................................. 720/706, 707
See application file for complete search history.

(56) References Cited

U.S. PATENT DOCUMENTS

| | | | | |
|---|---|---|---|---|
| 4,592,040 | A * | 5/1986 | Ohsaki ......................... | 720/706 |
| 5,583,717 | A * | 12/1996 | Nakata et al. .............. | 360/99.06 |
| 5,862,120 | A * | 1/1999 | Mukawa ....................... | 720/707 |
| 6,799,324 | B1 * | 9/2004 | Takagi et al. ................ | 720/712 |
| 7,448,054 | B2 * | 11/2008 | Lee et al. ...................... | 720/706 |
| 7,478,412 | B2 * | 1/2009 | Huh et al. .................... | 720/706 |
| 7,802,271 | B2 * | 9/2010 | Sonoda ........................ | 720/706 |
| 8,146,116 | B2 * | 3/2012 | Soga et al. .................... | 720/713 |
| 2002/0150027 | A1 * | 10/2002 | Kato ............................. | 369/270 |
| 2004/0244025 | A1 * | 12/2004 | Horng et al. .................. | 720/706 |
| 2005/0213484 | A1 * | 9/2005 | Hasegawa et al. ............ | 369/282 |
| 2006/0174255 | A1 * | 8/2006 | Chuo ............................ | 720/706 |
| 2006/0184957 | A1 * | 8/2006 | Koshino ....................... | 720/706 |
| 2007/0199010 | A1 * | 8/2007 | Chen ............................. | 720/706 |
| 2008/0046902 | A1 * | 2/2008 | Tanabe et al. ................ | 720/707 |
| 2011/0047563 | A1 * | 2/2011 | Yoon ............................. | 720/706 |

* cited by examiner

*Primary Examiner* — Brian Miller
(74) *Attorney, Agent, or Firm* — Jianq Chyun IP Office

(57) ABSTRACT

A clamping apparatus for being disposed in an optical disk drive and carrying a disk is provided. The clamping apparatus includes a base, a spindle assembly, a pawl and a buffer element. The spindle assembly is disposed on the base and rotating about an axis. The pawl is assembled to the spindle assembly. The disk is configured to be locked to the pawl, such that the spindle assembly drives the pawl and the disk to rotate about the axis. The buffer element is assembled to the spindle assembly, and the buffer element is located above the pawl. The buffer element interferes with the disk when the disk is separated from the pawl.

8 Claims, 6 Drawing Sheets

CLAMPING APPARATUS FOR CARRYING A DISK IN AN OPTICAL DISK DRIVE

CROSS-REFERENCE TO RELATED APPLICATION

This application claims the priority benefit of China application serial no. 201310073216.6, filed on Mar. 8, 2013. The entirety of the above-mentioned patent application is hereby incorporated by reference herein and made a part of this specification.

BACKGROUND OF THE INVENTION

1. Field of the Invention

The present invention relates to a clamping apparatus, and more particularly, to a clamping apparatus of an optical disk drive.

2. Description of Related Art

In recent years, optical disk apparatuses configured to be disk recording/reproducing apparatuses have been develop continuously. In general, an optical disk drive for driving an optical disk has become an indispensable tool for recording and regenerating the data in a personal computer (represented as computer hereafter), and can be built in the main body of the computer or externally connected to the main body of the computer by a cable. Generally speaking, an optical disk may be loaded in or ejected out from an optical disk drive manually or automatically.

Taking the optical disk ejected out automatically by a tray for example, the processes thereof are generally performed as described below.

When the disk is going to be ejected, the spindle assembly is driven to be moved away from the tray of the optical disk drive, such that the disk can be separated from the spindle assembly and stay on the tray through the force caused by the disk contacting the tray. Afterward, the disk is ejected out of the optical disk drive by the tray. However, the operation often causes the disk unable to stay on the tray stably under certain conditions. The main reason is that the disk is fixed to the spindle assembly of the optical disk drive by clamping method through the clip of the locking unit. Nevertheless, during such process of the disk separated from the spindle assembly described above, the locking unit retracts along a radial direction due to the axial force between the spindle assembly and the tray applied on the locking unit. However, at the time that the locking unit moves till the disk is separated from the spindle assembly, the disk still bears the axial force and causes the bounce effect. Even though the disk is still restricted within the inner space of the optical disk drive, the disk is unable to fall on the tray stably due to the bounce, that is to say, the disk and the tray are tilted to each other. When the tray is ejected from the optical disk drive, the tilted disk may stick with other inner components of the optical disk drive, so that the tray is unable to be ejected successfully which causes inconvenience for the user.

SUMMARY OF THE INVENTION

Accordingly, the present invention is directed to a clamping apparatus for clamping the disk, and for stably and successfully separating the disk from the clamping apparatus.

The present invention provides a clamping apparatus for carrying a disk. The clamping apparatus includes a base, a spindle assembly, a pawl and a buffer element. The spindle assembly is disposed on the base and rotating about an axis. The pawl is assembled to the spindle assembly. The disk is configured to be locked to the pawl, such that the spindle assembly drives the pawl and the disk to rotate about the axis. The buffer element is assembled to the spindle assembly, and the buffer element is located above the pawl. The buffer element interferes with the disk when the disk is released from the pawl.

According to an embodiment of the present invention, the spindle assembly includes a turntable and a top lid. The turntable has an axial core, and the axial core is located on the axis. The top lid has a sheath portion and a plurality of openings. The sheath portion slips on the axial core, such that the top lid is assembled to the turntable.

According to an embodiment of the present invention, the pawl includes a plurality of locking units. Each of the locking units includes a locking protrusion and an elastic element, wherein the locking protrusion is disposed between the top lid and the turntable, and the locking protrusion protrudes out of the top lid from one of the openings. The elastic element leans between the locking protrusion and the sheath portion. The elastic element drives the locking protrusion to move away from the axis radially.

According to an embodiment of the present invention, an outer diameter defined by the locking protrusions is greater than an inner diameter of the disk.

According to an embodiment of the present invention, the pawl has a plurality of locking protrusions protruding out of the top lid from a part of the openings radially. The buffer element includes a body and a plurality of buffer protrusions. The body is assembled in the top lid and leaned between the pawl and the top lid. The buffer protrusions protrude out of the top lid from another part of the openings.

According to an embodiment of the present invention, the locking protrusions and the buffer protrusions are alternately arranged about the axis, and the pawl and the buffer element are both arranged about the axis.

According to an embodiment of the present invention, the buffer element is fixed at the outside of the top lid.

According to an embodiment of the present invention, the material of the buffer element includes metal, plastic or rubber.

Based on the aforementioned description, in the embodiments of the present invention, the buffer element is located above the pawl when the disk is locked to the spindle assembly by the pawl, such that on the path of the disk separated from the spindle assembly, the disk can be stopped by the buffer element when the disk is separated from the spindle assembly through the axial force. Therefore, the axial force applied to the disk when the disk is separated from the spindle assembly is reduced by the buffer element, so as to prevent the disk from bouncing, and the disk is able to stay on the tray of the optical disk drive stably.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
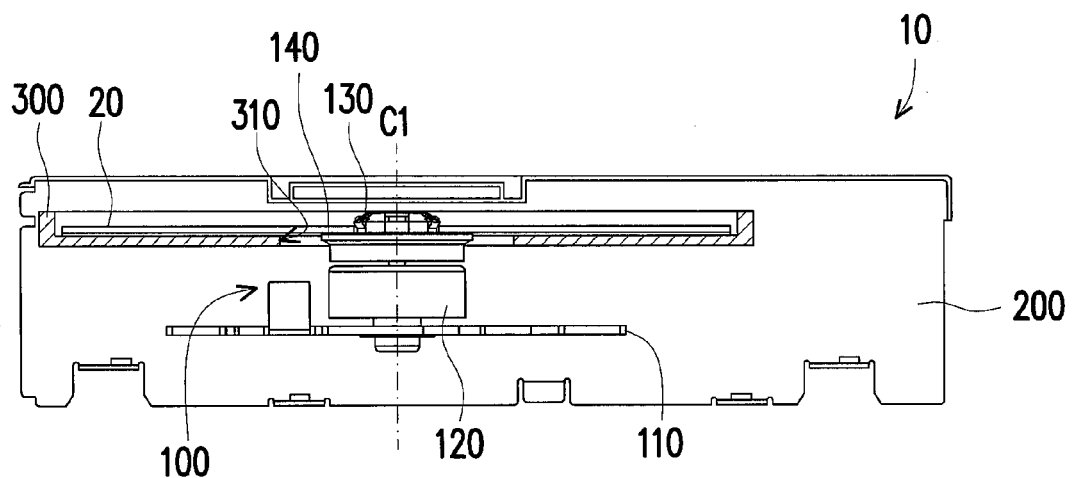
FIG. 1 and FIG. 2 are schematic views of a disk clamping apparatus according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
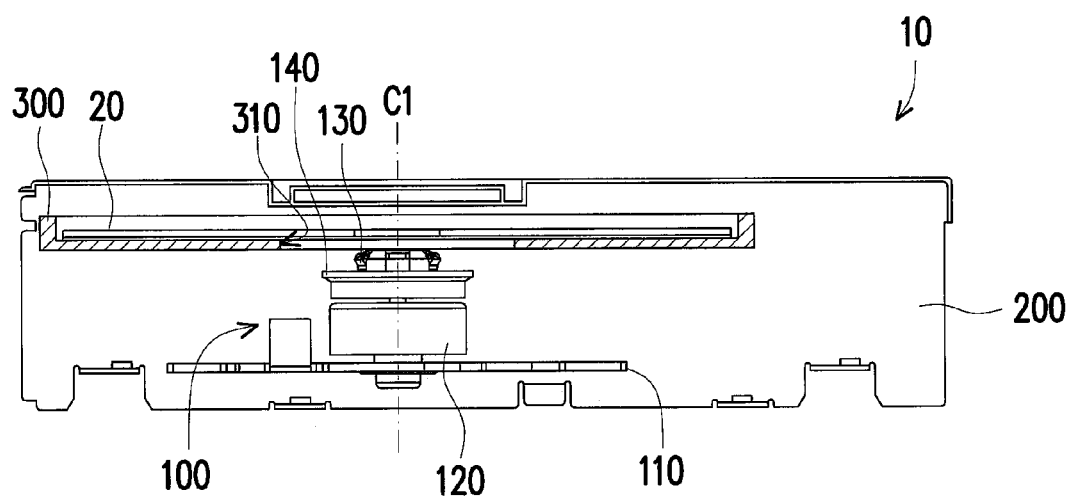

FIG. 1 and FIG. 2 are schematic views of a disk clamping apparatus according to one embodiment of the present invention. An optical disk drive 10 is disclosed herein, and the optical disk drive 10 includes a main body 200 and a tray 300 movably disposed in the main body 200 and a clamping apparatus 100. The tray 300 is moved along a direction of penetrating out of (or penetrating into) the figure, so as to send the disk 20 into or out of the main body 200.

The clamping apparatus 100 includes a base 110, a spindle assembly 120, a pawl 130 and a gasket 140. The base 110 is movably disposed in the main body 200 along an axis C1 to move toward or away from the tray 300. The spindle assembly 120 is, for example, a spindle motor assembly of the optical disk drive 10, which is disposed on the base 110 and moves along the axis C1. The pawl 130 is assembled to the spindle assembly 120. The disk 20 is configured to slip on the spindle assembly 120 and be locked by the pawl 130, such that the spindle assembly 120 drives the pawl 130 and the disk 20 to rotate around the axis C1. The gasket 140 is disposed on the spindle assembly 120 and is configured to carry the disk 20 to prevent the spindle assembly 120 from damaging the disk 20.

As shown in FIG. 2, when the disk 20 is going to be ejected, the base 110 is firstly driven to move downward along the axis C1, so as to move away from a hollow portion 310 of the tray 300. At the time, the disk 20 contacts the tray 300, so the disk 20 bears an axial force due to such contacting relationship and the disk 20 is separated from the clamping apparatus 100 gradually. Finally, the tray 300 sends the disk 20 out of the main body 200.

Figure 3:
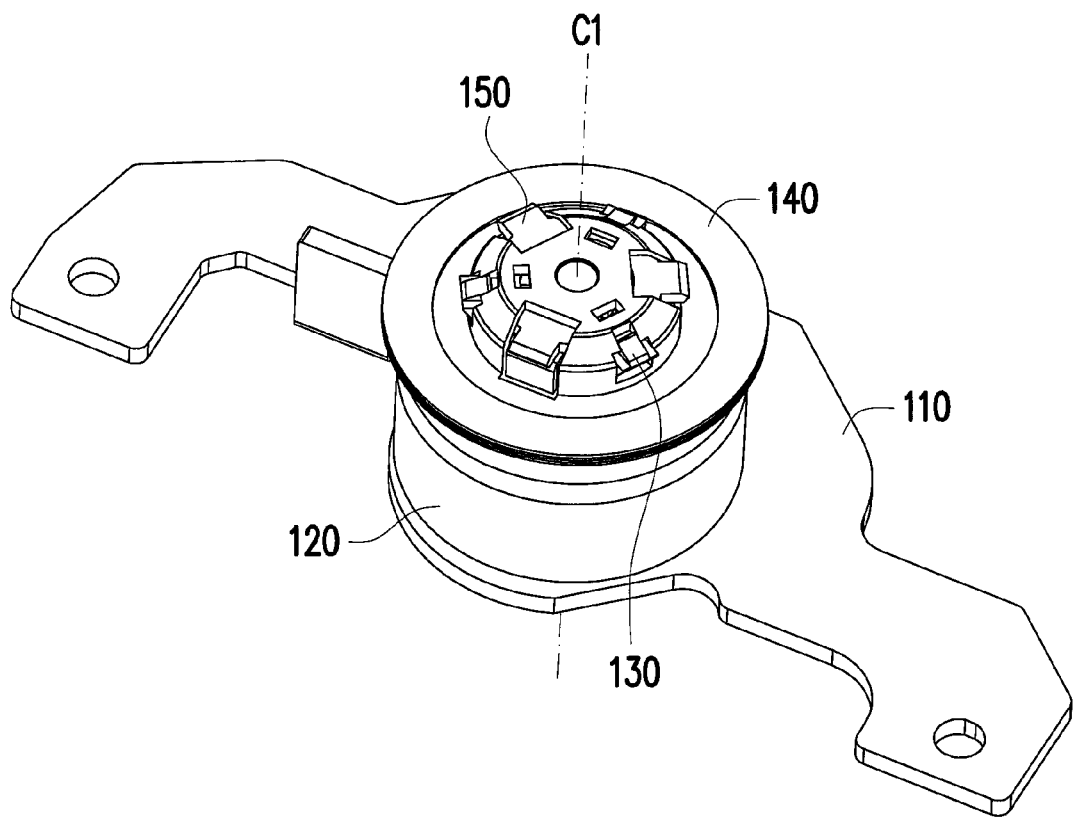
FIG. 3 is a schematic view of a clamping apparatus according to one embodiment of the present invention.
Figure 4:
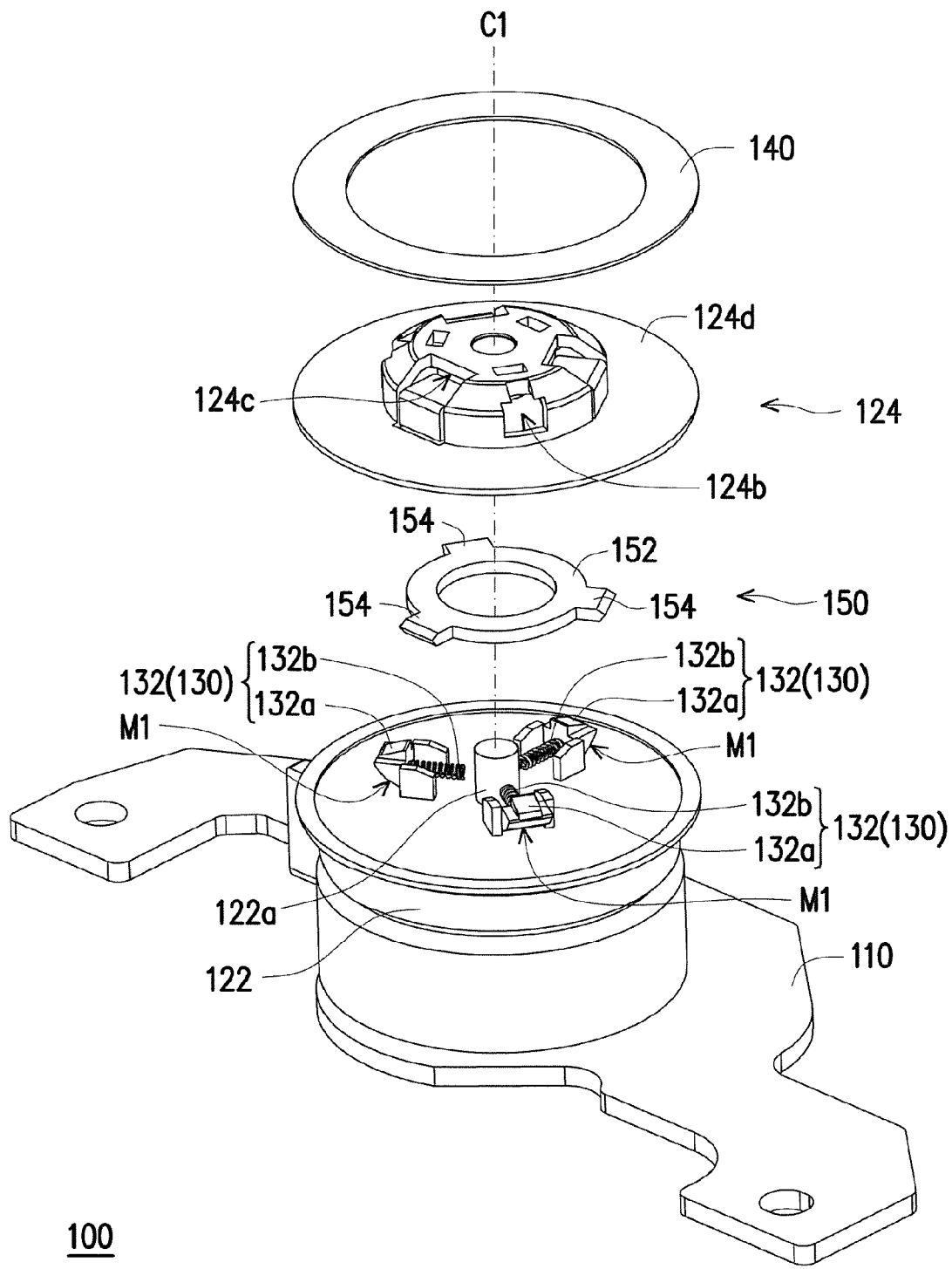
FIG. 4 and FIG. 5 are exploded views from different view angles of the clamping apparatus in FIG. 3, respectively.
Figure 5:
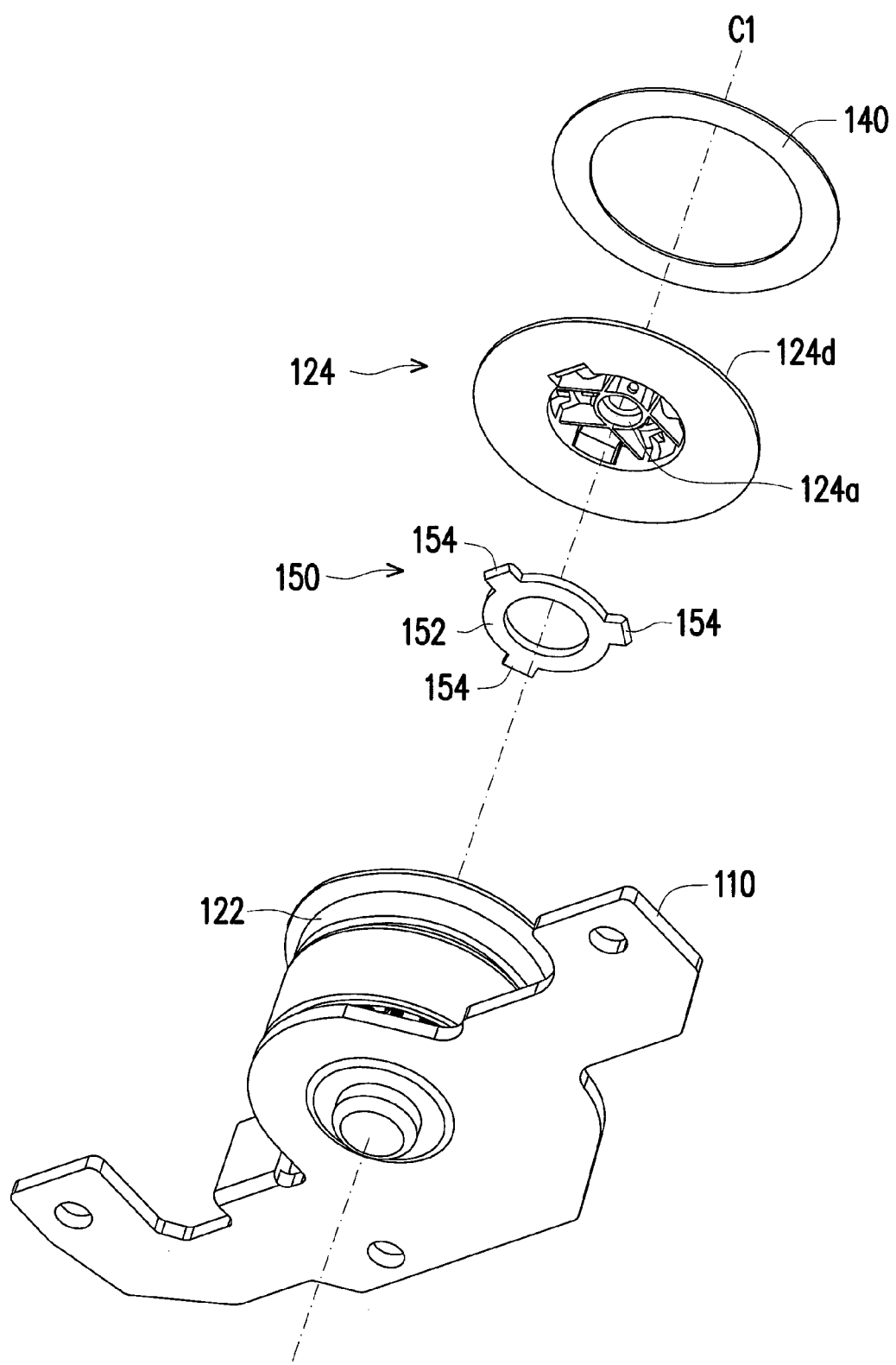

FIG. 3 is a schematic view of a clamping apparatus according to one embodiment of the present invention. FIG. 4 and FIG. 5 are exploded views from different view angles of the clamping apparatus in FIG. 3, respectively. Referring to FIG. 3 to FIG. 5, in the present embodiment, the clamping apparatus 100 further includes a buffer element 150 assembled to the spindle assembly 120. The buffer element 150 is located above the pawl 130. The buffer element 150 and the pawl 130 are disposed about the same axis, which is the axis C1. The maximum dimension of the buffer element 150 along a radial direction thereof is greater than an inner diameter of the disk 20.

When the disk 20 as shown in FIG. 1 is disposed in the main body 200, the disk 20 is locked to the spindle assembly 120 by the pawl 130. When the disk 20 is switched from the condition shown in FIG. 1 to the condition shown in FIG. 2, the disk 20 bears the above-mentioned axial force, so as to press and push the pawl 130 to retract inward (toward the axis C1), such that the disk 20 can be separated from the pawl 130. At the time that the disk 20 is separated from the pawl 130 due to the axial force, the buffer element 150 stops and interferes with the disk 20, so that the disk 20 stays between the pawl 130 and the buffer element 150 temporarily, or stays on the buffer element 150, so as to prevent the disk 20 from ejecting out of the tray 300 directly. Finally, the disk 20 is gradually separated from the spindle assembly 120 and stays on the tray 300 stably.

In detail, in the present embodiment, the spindle assembly 120 includes a turntable 122 and a top lid 124. The turntable 122 is disposed on a spindle motor and the turntable 122 has an axial core 122a, wherein the axial core 122a is located on the axis C1. The top lid 124 has a sheath portion 124a and a plurality of openings 124b, 124c. The sheath portion 124a slips on the axial core 122a, such that the top lid 124 is assembled to the turntable 122.

In addition, the pawl 130 is composed of a plurality of locking units 132. Each of the locking units 132 includes a locking protrusion 132a and an elastic element 132b, wherein each of the locking protrusions 132a is disposed between the top lid 124 and the turntable 122, and protruded out of the top lid 124 from one of the openings 124b. Each of the elastic elements 132b leans between the corresponding locking protrusion 132a and the sheath portion 124a.

The buffer element 150 includes a body 152 and a plurality of buffer protrusions 154, wherein the body 152 is assembled in the top lid 124 and leans between the locking protrusions 132a of the pawl 130 and the top lid 124. The buffer protrusions 154 are protruded out of the top lid 124 from another part of the openings 124c. To be more specific, in the present embodiment, the locking protrusions 132a and the buffer protrusions 154 are not only disposed about the same axis, which is the axis C1, but also arranged alternately about the axis C1. However, the buffer protrusions 154 may be disposed right above the locking protrusions 132a and not arranged alternately.

In addition, the elastic elements 132b of the present embodiment always drive the corresponding locking protrusions 132a to move radially away from the axis C1, such that an outer diameter defined by the locking protrusions 132a are greater than the inner diameter of the disk 20, so the disk 20 can be locked to the circular platform 124d of the top lid 124 stably. Therefore, when the base 110 moves away from the tray 300 along the axis C1, the axial force makes the inner edge of the disk 20 push the inclined guide surfaces M1 of the locking protrusions 132a, so the locking protrusions 132a are radially moved inward (toward the axis C1) to deform the elastic element 132b. The disk 20 is not separated from the pawl 130 until the outer diameter defined by the locking protrusions 132a is smaller than or equal to the inner diameter of the disk 20. At the time, however, the axial force still exists, so the disk 20 would be ejected out of the tray 300 along the axis C1 right at the moment the disk 20 is separated from the pawl 130. Thereby, the buffer protrusions 154 extended out of the top lid 124 radially and located above the locking protrusions 132a stop and interfere with the disk 20 effectively, and absorb the impact caused by the above-mentioned axial force, so as to effectively prevent the disk 20 from bouncing out of a carrying range of the tray 300.

In the present embodiment, the material of the buffer element 150 has elasticity and flexibility, and includes plastic, metal or rubber, etc. That is to say, any material configured to stop and absorb the impact of the disk 20 along the axis C1 may be adapted to be the buffer element 150 in the present embodiment.

In the present embodiment, the buffer protrusions 154 has two inclined guide surfaces, by means of the elasticity and the flexibility of the buffer element 150 and the inclined guide surfaces, the disk 20 may pass the buffer protrusions 154 successfully and be locked on the locking protrusions 132a, or be separated from the spindle assembly 120 and ejected out of the main body 200 by the tray 300.

In the above-mentioned embodiments, the buffer element 150 is disposed in the top lid 124 so the buffer protrusions 154 protrude out of the top lid 124 from the openings 124c of the top lid 124, however, in consideration of the size of the inner space of the top lid 124 and the structural design in whole, the buffer element 150 may also be disposed at the outside of the top lid 124 and is connected to the outside of the top lid 124 by the body 152, so the buffer protrusions 154 are located above the locking protrusions 132a. Alternatively, the buffer element 150 only includes a plurality of buffer protrusions 154, and the buffer protrusions 154 are fixed at the outside of the top lid 124 by mounting or adhering method, so the buffer protrusions 154 are located above the locking protrusions 132a.

Figure 6:
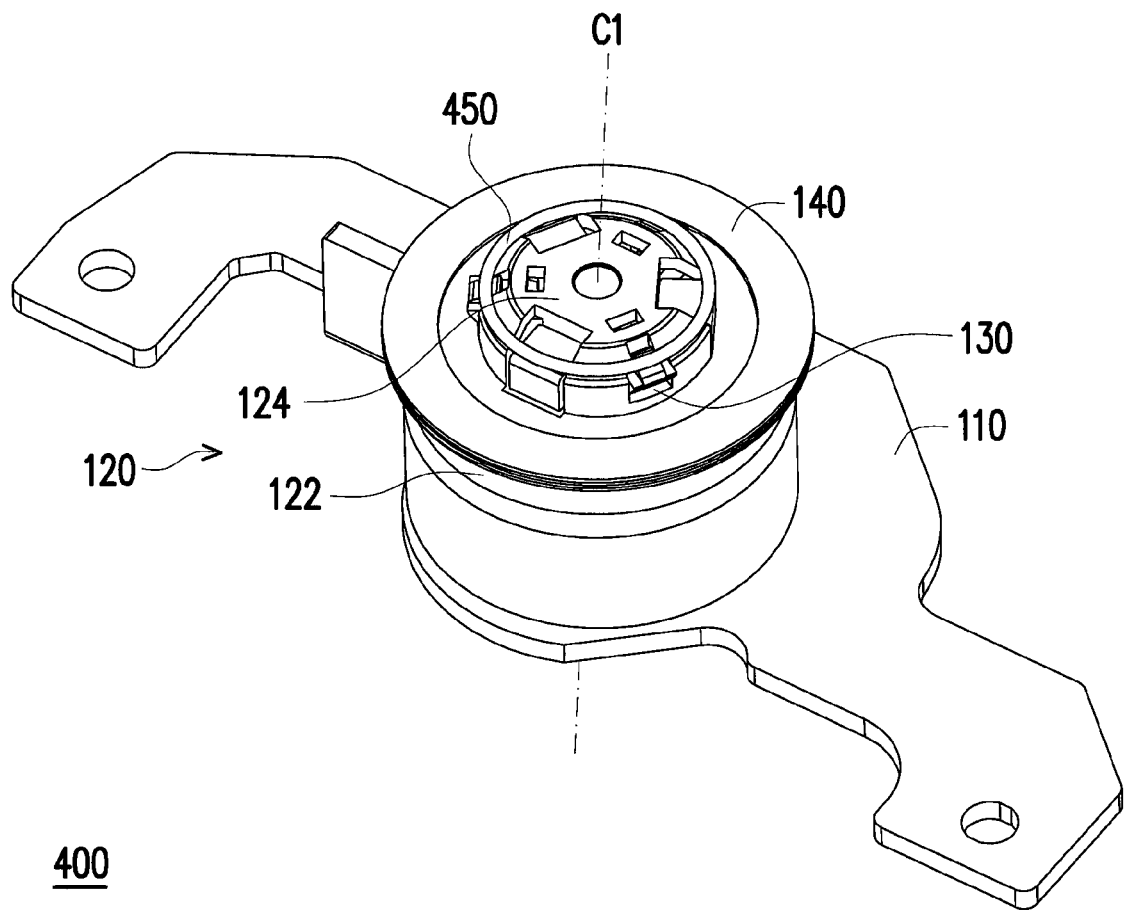
FIG. 6 is a schematic view of a clamping apparatus according to another embodiment of the present invention.
Figure 7:
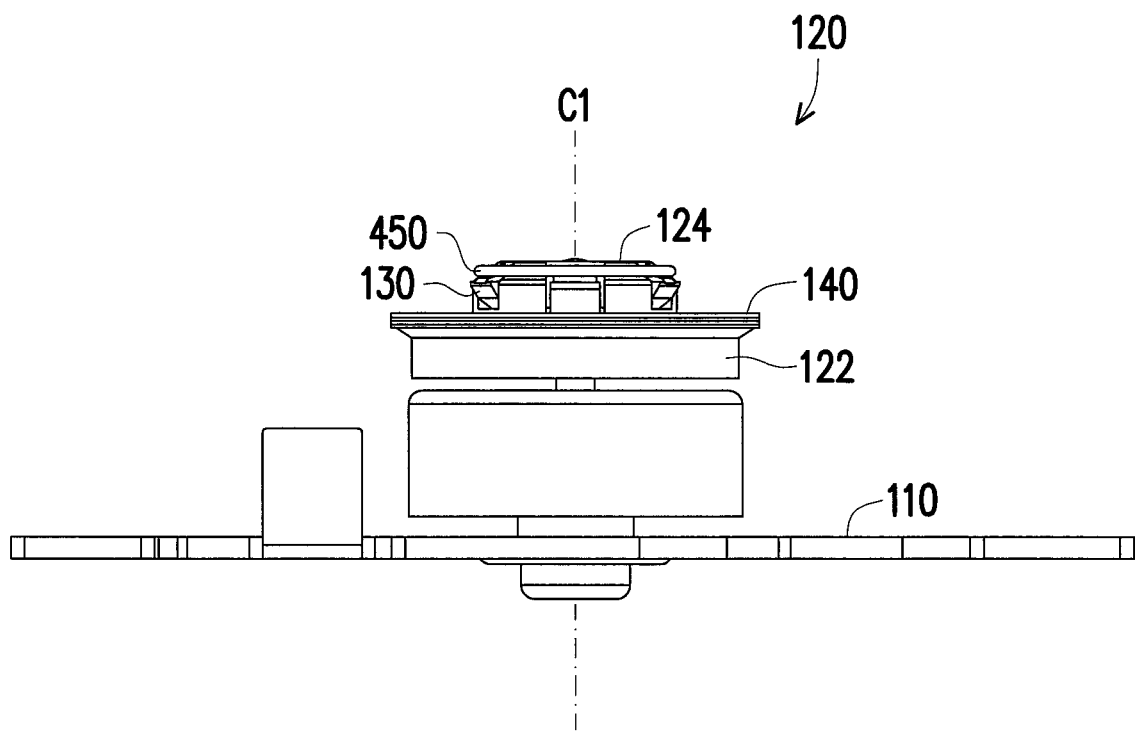
FIG. 7 is a side view of the clamping apparatus in FIG. 6.

FIG. 6 is a schematic view of a clamping apparatus according to another embodiment of the present invention. FIG. 7 is a side view of the clamping apparatus in FIG. 6. Referring to FIG. 6 and FIG. 7, the difference between the present embodiment and the above-mentioned embodiments is that, in the clamping apparatus 400 of the present embodiment, the buffer element 450 is a rubber ring fixed to the outside of the top lid 124, and is located above the locking protrusions 132a. Therefore, at the moment the disk 20 is separated from the locking protrusions 132a, the buffer element 450 reduces the impact on the disk 20 by interfering with the disk 20. Meanwhile, the process of the spindle assembly 120 moved away from the tray 300 along with the base 110 may be performed smoothly and stably by means of the arc shape of the buffer element 450.

In summary, in the embodiments of the present invention, the buffer element is located above the locking protrusions, so the impact caused by the disk separated from the spindle assembly through the axial force can be stopped and absorbed by the buffer element, and the disk may stay between the pawl and the buffer element, or on the buffer element, temporarily. Afterward, when the spindle assembly is continuously moved away from the tray, the disk may stably stay on the tray. Therefore, the bouncing of the disk when the disk is separated from the spindle assembly is effectively avoided and the stability is improved by adopting the disposition of the buffer element described in the previous embodiments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A clamping apparatus for being disposed in an optical disk drive and carrying a disk, the clamping apparatus comprising:
    a base;
    a spindle assembly disposed on the base and rotating about an axis;
    a pawl assembled to the spindle assembly, wherein the disk is configured to be locked by the pawl, such that the spindle assembly drives the pawl and the disk to rotate about the axis; and
    a buffer element assembled to the spindle assembly, wherein the buffer element is located above the pawl and the buffer element interferes with the disk when the disk is separated from the pawl.

2. The clamping apparatus as claimed in claim 1, wherein the spindle assembly comprises:
    a turntable having an axial core, wherein the axial core is located on the axis; and
    a top lid having a sheath portion and a plurality of openings, wherein the sheath portion slips on the axial core, such that the top lid is assembled to the turntable.

3. The clamping apparatus as claimed in claim 2, wherein the pawl includes a plurality of locking units, each of the locking units comprises:
    a locking protrusion disposed between the top lid and the turntable and the locking protrusion protruding out of the top lid from one of the openings; and
    an elastic element leaning between the locking protrusion and the sheath portion, wherein the elastic element drives the locking protrusion to move away from the axis radially.

4. The clamping apparatus as claimed in claim 3, wherein an outer diameter defined by the locking protrusion is greater than an inner diameter of the disk.

5. The clamping apparatus as claimed in claim 2, wherein the pawl has a plurality of locking protrusions protruding out of the top lid from a part of the openings, and the buffer element comprises:
    a body assembled in the top lid and leaned between the pawl and the top lid; and
    a plurality of buffer protrusions protruding out of the top lid from another part of the openings.

6. The clamping apparatus as claimed in claim 5, wherein the locking protrusions and the buffer protrusions are alternately arranged about the axis and the pawl and the buffer element are arranged about the axis.

7. The clamping apparatus as claimed in claim 2, wherein the buffer element is fixed at the outside of the top lid.

8. The clamping apparatus as claimed in claim 1, wherein the material of the buffer element includes metal, plastic or rubber.

* * * * *